US011390317B2

(12) United States Patent
Varga et al.

(10) Patent No.: US 11,390,317 B2
(45) Date of Patent: Jul. 19, 2022

(54) ELECTROMECHANICAL POWER STEERING SYSTEM CONTROL USING ONLY MEASURED OR ESTIMATED STEERING TORQUE SIGNAL

(71) Applicants: thyssenkrupp Presta AG, Eschen (LI); thyssenkrupp AG, Essen (DE)

(72) Inventors: Ádám Varga, Budapest (HU); Gábor Kalapos, Gyömrő (HU); Márton Helli, Budapest (HU); Csaba Fazekas, Budakeszi (HU)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 336 days.

(21) Appl. No.: 16/642,061

(22) PCT Filed: Sep. 13, 2017

(86) PCT No.: PCT/EP2017/073032
§ 371 (c)(1),
(2) Date: Feb. 26, 2020

(87) PCT Pub. No.: WO2019/052642
PCT Pub. Date: Mar. 21, 2019

(65) Prior Publication Data
US 2021/0070350 A1 Mar. 11, 2021

(51) Int. Cl.
B62D 5/04 (2006.01)
B62D 6/00 (2006.01)
H02P 6/08 (2016.01)

(52) U.S. Cl.
CPC ............ B62D 5/0463 (2013.01); B62D 6/00 (2013.01); H02P 6/08 (2013.01); H02P 2205/05 (2013.01)

(58) Field of Classification Search
None
See application file for complete search history.

(56) References Cited

U.S. PATENT DOCUMENTS

| 11,031,880 B2* | 6/2021 | Ghaderi | ............... B62D 5/0403 |
| 2008/0035411 A1* | 2/2008 | Yamashita | ............. B62D 5/049 180/443 |

(Continued)

FOREIGN PATENT DOCUMENTS

| CN | 1891552 A | 1/2007 |
| CN | 106741136 A | 5/2017 |

(Continued)

OTHER PUBLICATIONS

International Search Report issued in PCT/EP2017/073032, dated May 30, 2018.

*Primary Examiner* — Kevin Hurley
(74) *Attorney, Agent, or Firm* — thyssenkrupp North America, LLC

(57) ABSTRACT

A disclosed method can control an electric motor for an electromechanical power steering mechanism for assisting steering for a motor vehicle. The electromechanical power steering mechanism may include a steering column with an upper steering shaft linked to a lower steering shaft by a torsion bar. A torsion angle between the upper steering shaft and the lower steering shaft is configured to be measured or estimated, and an electric motor is configured to apply an assistance torque. The method may involve calculating a desired rotor position with an assist algorithm based on the torsion angle and calculating a PWM pattern by a PWM control unit such that the calculated PWM pattern adjusts a rotor of an electric motor angle such that the torsion angle is decreased.

8 Claims, 1 Drawing Sheet

(56) References Cited

U.S. PATENT DOCUMENTS

| | | |
|---|---|---|
| 2015/0203148 A1 | 7/2015 | Kuramitsu |
| 2016/0137219 A1 | 5/2016 | Schröder et al. |
| 2017/0080971 A1 | 3/2017 | Soti et al. |
| 2020/0295631 A1 * | 9/2020 | Yamashita .............. H02M 7/48 |

FOREIGN PATENT DOCUMENTS

| | | |
|---|---|---|
| CN | 107010099 A | 8/2017 |
| DE | 19837665 A | 3/1999 |
| DE | 102010052441 A | 5/2012 |
| DE | 112020002073 T5 * | 1/2022 |

* cited by examiner

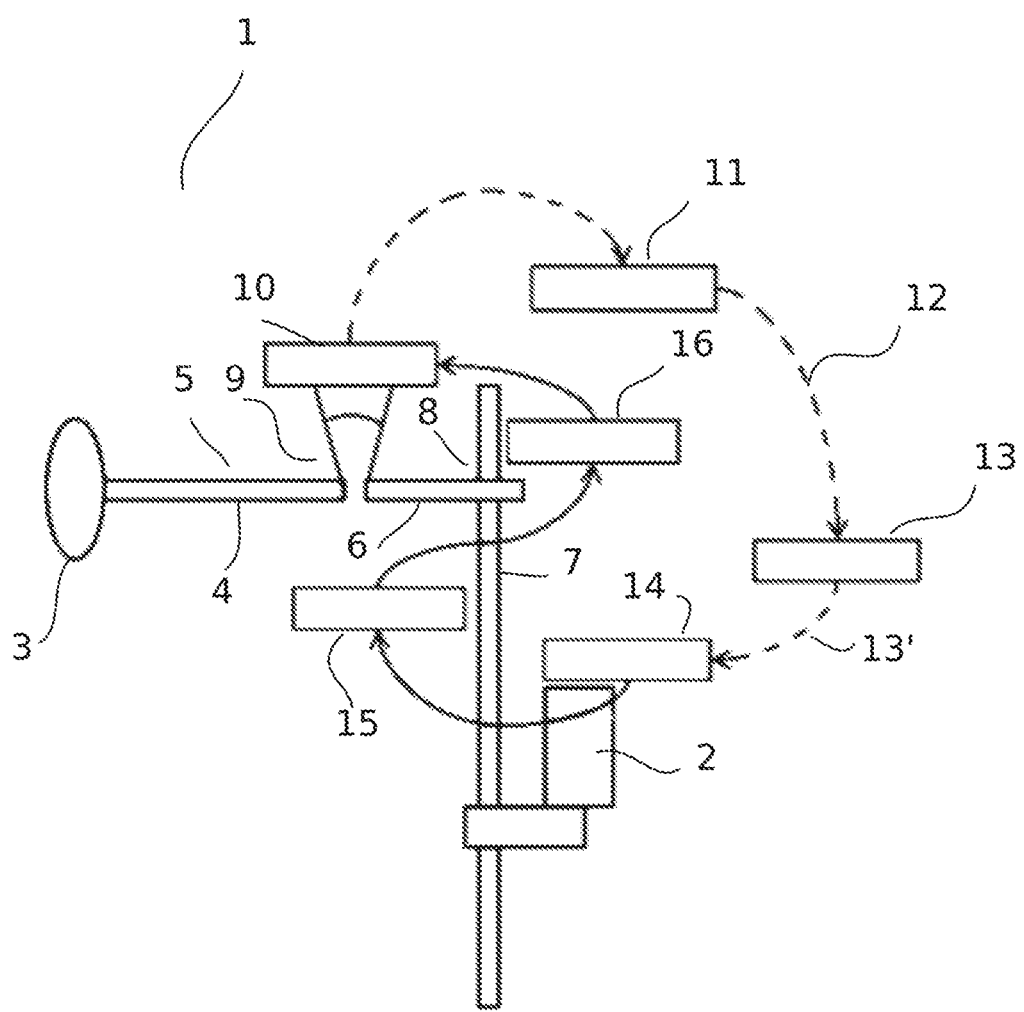

ELECTROMECHANICAL POWER STEERING SYSTEM CONTROL USING ONLY MEASURED OR ESTIMATED STEERING TORQUE SIGNAL

CROSS REFERENCE TO RELATED APPLICATION

This application is a U.S. National Stage Entry of International Patent Application Serial Number PCT/EP2017/073032, filed Sep. 13, 2017, the entire content of which is incorporated herein by reference.

FIELD

The present disclosure generally relates to methods for assisting control of electromechanical power steering mechanisms of motor vehicles.

BACKGROUND

In an electromechanical power steering mechanism a steering shaft is connected to a steering wheel for operation by the driver. The steering shaft is coupled to a steering rack via a gear pinion. Steering rack rods are connected to the steering rack and to steered wheels of the motor vehicle. A rotation of the steering shaft causes an axial displacement of the steering rack by means of the gear pinion, which is connected to the steering shaft in a torque-proof manner. Assist force is applied to a steering mechanism by driving an electric motor. A steering controller in form of an electronic control unit (ECU) controls the assist of the electric motor. In response to the vehicle velocity, the operator torque and the rotor position signal detected by a rotor position sensor, the controller determines the target motor torque and provides the signal through to the motor controller, where the motor currents are calculated via PWM (pulse-width modulation). The applied PWM determines the position of the rotor of an electric motor. For the control of the electric motor usually a rotor position and/or rotor speed sensor and a current sensor are needed. The current/torque control of the electric motor becomes impossible in case one or both of the aforementioned sensors are faulty or missing.

Thus a need exists for methods for assist control of an electromechanical power steering mechanism of a motor vehicle where the electric motor is able to assist even when the system either does not have the required sensors to measure the position of the rotor of an electric motor or has faulty sensors.

BRIEF DESCRIPTION OF THE FIGURE

FIG. 1 is a schematic view of an example electromechanical motor vehicle power steering mechanism with illustrated control cycle of an electric motor.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a method for control of an electric motor for an electromechanical power steering mechanism for assisting steering for a motor vehicle, the electromechanical power steering mechanism comprising a steering column with an upper steering shaft linked to a lower steering shaft by a torsion bar, wherein the torsion angle between the upper steering shaft and the lower steering shaft is measured or estimated and an electric motor being adapted to apply an assistance torque, wherein the method includes the following steps: Calculation of a desired rotor position by an assist algorithm based on the torsion angle; and Calculation of a PWM pattern by a PWM control unit, in such a way that the calculated PWM pattern adjusts the rotor of an electric motor angle such that the magnitude of the torsion angle is decreased.

This method does only depend on the torsion angle and the calculated desired rotor position and can thus be carried out independent of a sensor which measures the position of the rotor of an electric motor.

In one embodiment the torsion angle is preferably measured in a torque sensor unit, which measures the relative shift angle between the upper steering shaft and the lower steering shaft.

In a second embodiment the torsion angle is estimated by a steering wheel angle sensor and/or steering wheel angle speed sensor and other vehicle information.

The calculation of the desired rotor position by the assist algorithm can depend on the motor vehicle speed.

Preferably, the method does in general not depend on a rotor position sensor of the electric motor and/or on a current sensor measuring the current flowing through the motor phases.

FIG. 1 shows a schematic illustration of an electromechanical motor vehicle power steering mechanism 1 with illustrated control cycle of an electric motor 2. Arrows with dashed lines mark electrical signals and software variables. Arrows with solid lines mark mechanical couplings.

The electric motor 2 is a permanent magnet synchronous motor with at least three phases. A steering wheel 3 is fixed to an upper steering shaft 4 of a steering column 5, the steering movement of the driver is transmitted via a torsion bar (not shown) to a lower steering shaft 6. The lower steering shaft 6 is coupled to a rack 7 via a rack-and-pinion mechanism 8. Rotation of the upper and lower steering shaft 4,6 accompanying a steering operation is converted into a reciprocating linear motion of the toothed rack 7 by the rack-and-pinion mechanism 8. A torque sensor unit (TSU) 9 measures the relative shift angle 10 between the upper steering shaft 4 and the lower steering shaft 6. This measured torsion angle 10 is the angle difference between the steering wheel angle and the rack/rotor position. The torque is proportional to the position difference at the both ends of the torsion bar. The torsion angle 10 is fed to an assist algorithm 11 of the electronic control unit of the electric power assisted steering system to determine the desired rotor position 12. Based on the desired rotor position 12 the motor currents are calculated via a PWM (pulse-width modulation) control unit 13. The assist is provided such a way, that the measured torsion angle 10 is decreased. For that a PWM pattern 13' is calculated in the PWM control unit 13 which adjusts the rotor position 14 such that the rack position 15 and accordingly the pinion angle 16 are changed and the torsion angle 10 on the TSU torsion bar is decreased. Provided assist can depend on the motor vehicle speed. The assist control does only depend on the torsion angle and the calculated desired rotor position. The method does therefore not depend on position, speed or current sensors of the electric motor.

In another embodiment the desired rotor position 12 is defined by a steering wheel angle sensor and/or steering wheel angle speed sensor and other vehicle information e.g. vehicle speed, lateral acceleration and/or yaw rate. From these measurements the torsion of the column can be estimate. Based on this estimation the previously described method can be carried out to provide assist.

What is claimed is:

1. A method for assist control of an electromechanical power steering mechanism for a motor vehicle, wherein the electromechanical power steering mechanism comprises a steering column with an upper steering shaft linked to a lower steering shaft by a torsion bar, wherein a torsion angle between the upper and lower steering shafts is configured to be measured or estimated, wherein an electric motor is configured to apply an assistance torque, the method comprising:
   calculating a desired rotor position by an assist algorithm based on the torsion angle; and
   calculating a PWM pattern with a PWM control unit such that the calculated PWM pattern adjusts a rotor of an electric motor angle such that the torsion angle is decreased.

2. The method of claim 1 comprising measuring the torsion angle in a torque sensor unit, which measures a relative shift angle between the upper steering shaft and the lower steering shaft.

3. The method of claim 1 comprising estimating the torsion angle based on vehicle information with at least one of a steering wheel angle sensor or a steering wheel angle speed sensor.

4. The method of claim 1 wherein calculating the desired rotor position by the assist algorithm depends on a speed of the motor vehicle.

5. The method of claim 1 wherein control of the electric motor depends only on the torsion angle and the calculated desired rotor position.

6. The method of claim 1 wherein control of the electric motor is independent of a rotor position sensor of the electric motor.

7. The method of claim 1 wherein control of the electric motor is independent of a current sensor measuring current flowing through motor phases.

8. The method of claim 1 wherein the electric motor is a permanent magnet synchronous motor with at least three phases.

* * * * *